United States Patent [19]

Sburlati et al.

[11] Patent Number: 4,691,946
[45] Date of Patent: Sep. 8, 1987

[54] UNIT FOR CONNECTING A SEAT TO MOTOR VEHICLE FLOOR

[75] Inventors: Luigi Sburlati, Turin; Giovanni Acuto, Orbassano; Giuseppe Stacchino, Moncalieri, all of Italy

[73] Assignee: Fiat Auto S.p.A., Turin, Italy

[21] Appl. No.: 763,129

[22] Filed: Aug. 6, 1985

[30] Foreign Application Priority Data

Aug. 9, 1984 [IT]  Italy ............................... 53718/84[U]

[51] Int. Cl.⁴ ........................................ F16M 13/00
[52] U.S. Cl. .................................. 248/429; 297/252; 296/65 R; 248/393
[58] Field of Search ........ 248/429, 229, 230, 393–395; 296/63, 65 R; 297/230, 231, 252

[56] References Cited

U.S. PATENT DOCUMENTS

| | | | |
|---|---|---|---|
| 2,780,501 | 2/1957 | Rosenburg | 248/430 |
| 2,964,093 | 12/1960 | Lonr | 248/429 |
| 3,228,732 | 1/1966 | Peras | 248/429 |
| 3,411,820 | 11/1968 | Brett et al. | 296/63 |
| 3,779,503 | 12/1973 | Lombardo | 248/429 |
| 3,806,191 | 4/1974 | Stegmaier | 248/429 |
| 3,899,151 | 8/1975 | Kobrehel | 248/429 |
| 3,944,201 | 3/1976 | Tantlinger | 296/63 |
| 4,089,500 | 5/1978 | Gustafsson | 248/429 |
| 4,169,574 | 10/1979 | Garvey et al. | 248/429 |
| 4,210,303 | 7/1980 | Torta et al. | 296/65 R |
| 4,273,376 | 6/1981 | Duget et al. | 296/65 R |
| 4,281,871 | 8/1981 | Gritther et al. | 296/65 R |
| 4,436,270 | 3/1984 | Muraishi | 296/65 R |
| 4,474,492 | 10/1984 | Fleitas | 403/14 |
| 4,516,811 | 5/1985 | Akiyama et al. | 296/65 R |
| 4,588,225 | 5/1986 | Sakamoto | 248/420 |

FOREIGN PATENT DOCUMENTS

| | | | |
|---|---|---|---|
| 668106 | 8/1963 | Canada | 248/420 |
| 2304951 | 8/1977 | Fed. Rep. of Germany | 248/429 |

Primary Examiner—Cornelius J. Husar
Assistant Examiner—Eric K. Nicholson
Attorney, Agent, or Firm—Pearne, Gordon, McCoy & Granger

[57] ABSTRACT

The connection unit for a seat comprises guides resting on a frame fixable to the motor vehicle floor, in such a manner as to enable the seat to be supported by said floor and to undergo translational movement relative thereto, Said guides comprise a first portion arranged for fixing to the seat and to translate relative to a second portion. This latter is arranged to form a connection with said frame by way of positioning means and locking means.

8 Claims, 4 Drawing Figures

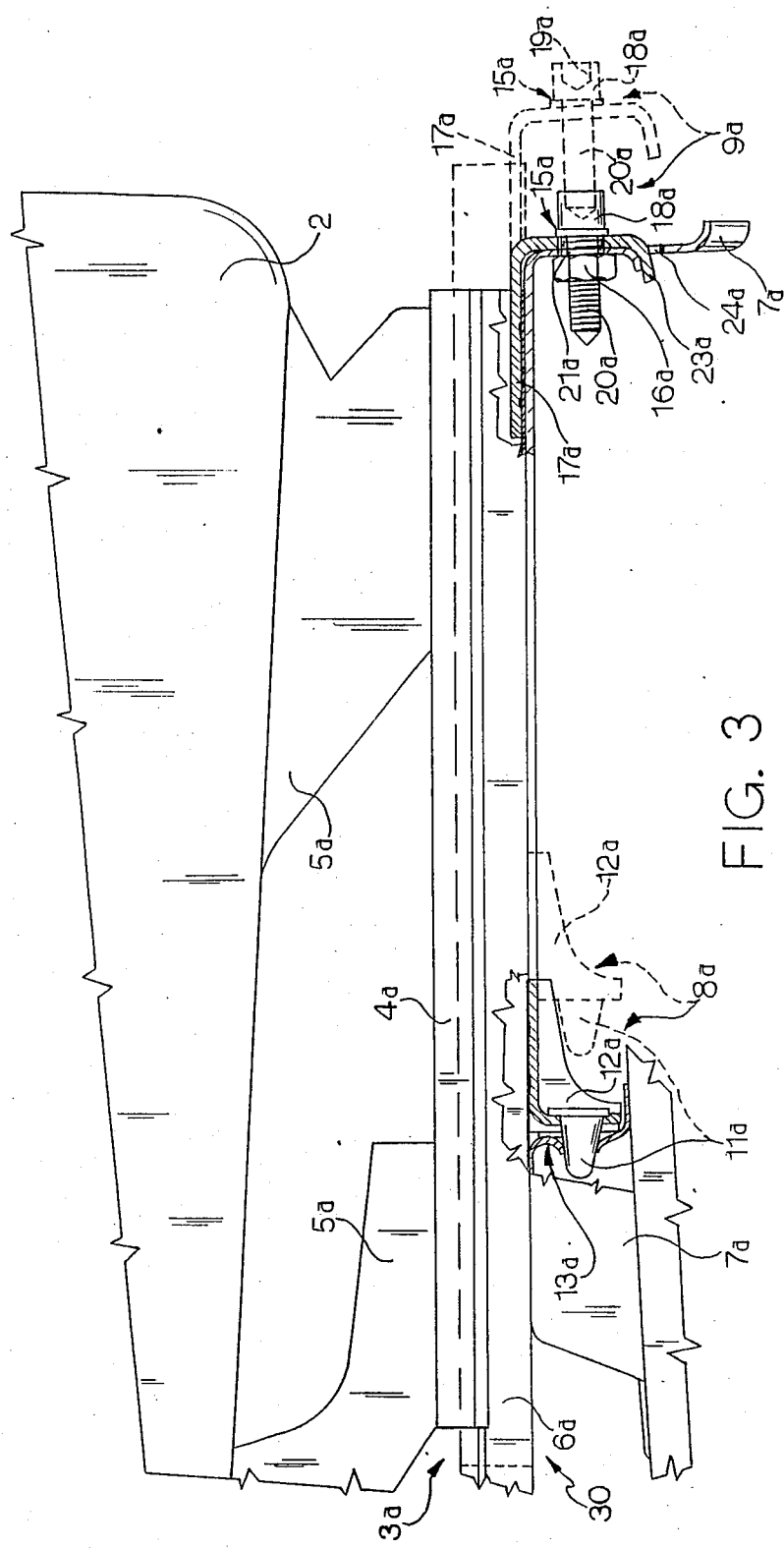

UNIT FOR CONNECTING A SEAT TO MOTOR VEHICLE FLOOR

This invention relates to a unit for connecting a seat to a motor vehicle floor.

Numerous systems are known for connecting a seat, particularly the front seat, to a motor vehicle floor.

SUMMARY OF THE INVENTION

An object of the present invention is to provide a unit for connecting a seat to a motor vehicle floor in such a manner as to allow the seat to undergo translational movement relative to the floor while always obtaining reliable anchoring of the seat to said floor. A further object of the present invention is to provide a connection unit which simplifies the mounting operations so that the latter can also be effected by automatic machines.

Said object is attained according to the present invention by a unit for connecting a seat to a motor vehicle floor, characterised by comprising guide means resting on a frame fixable to the floor, in such a manner as to enable said seat to be supported by said floor and undergo translational movement relative thereto; said guide means comprising two first portions and two second portions, each of said first portions being arranged for fixing to said seat and to translate relative to one of said second portions, each said second portions being arranged to form a connecton with said frame by way of one positioning means, connected to said guide means in a position near one end of said seat, and one locking means connected to said guide means in a position near the other end of said seat, both positioning and locking means being fixed to said second portion and cooperating with relevant seatings provided in said frame.

BRIEF DESCRIPTION OF THE DRAWINGS

The present invention will be more apparent from the description of a preferred embodiment thereof given by way of non-limiting example hereinafter with reference to the accompanying drawings, in which:

FIG. 3 is a partly sectional elevational view of a second embodiment of a connection unit constructed in accordance with the present invention.

DETAILED DESCRIPTION OF THE INVENTION

Figure 1:
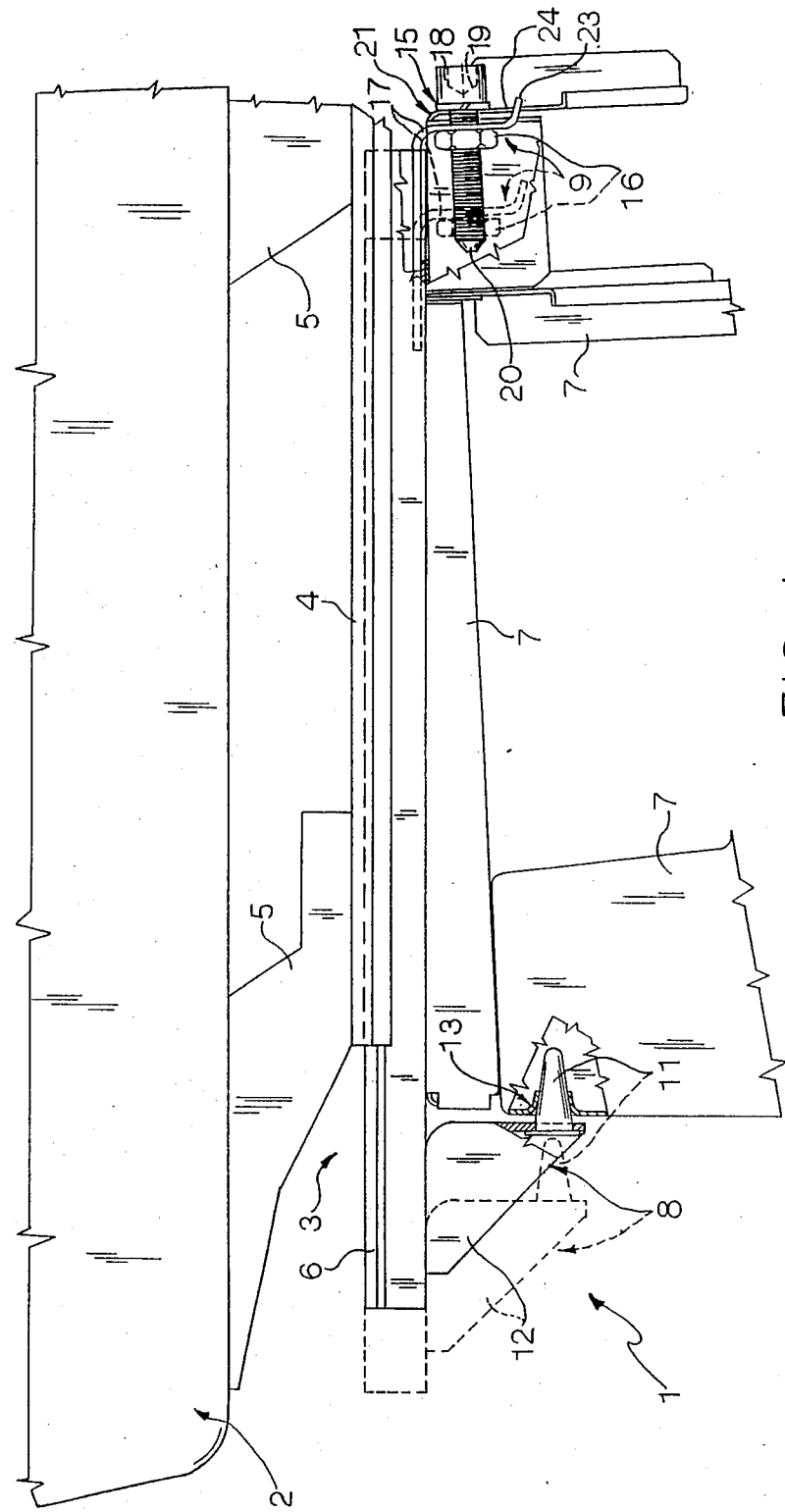
FIG. 1 is an elevational view of a first embodiment of a connection unit constructed in accordance with the present invention.
Figure 2:
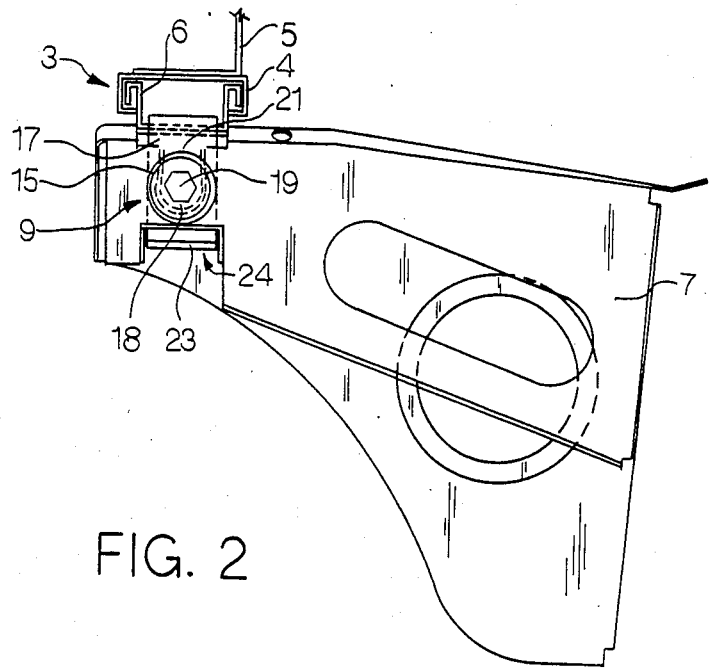
FIG. 2 is a side elevational view of a detail of FIG. 1.

In FIGS. 1 and 2, the reference numeral 1 indicates overall a unit for connecting a seat 2, particularly a front seat, to a motor vehicle floor (not shown). The connection unit 1 comprises essentially guide means 3 having a first portion 4 which supports the seat 2 by means of brackets 5, and a second portion 6 which rests on a frame 7 and is connected to the latter by way of positioning means 8 and locking means 9 respectively.

The guide means 3, of essentially known type, are respectively constituted by two section bars of C configuration (portion 4) and U configuration (portion 6) respectively.

The positioning means 8 are essentially constituted by a pin 11 in the form of a cone with a rounded point, which is supported at its base by a suitable bracket 12 fixed, for example welded, to that end of the portion 6 positioned at the front end of the seat 2. When in use, the pin 11 engages a corresponding seating 13 provided by the frame 7.

The locking means 9 are essentially constituted by a screw 15 premounted by means of its own nut 16 fixed on a bracket 17 which is fixed, for example welded, to that portion 6 of the guide means 3 at the opposite end to that carrying the bracket 12. More particularly, the screw 15 comprises a heat 18 with a hexagonal seat 19 for screwing purposes, and a shank 20 which when in use is disposed in a corresponding slot 21 provided in the frame 7. Finally, the bracket 17, essentially of L configuration, comprises an outwardly bent end lug 23 which engages a corresponding seating 24 provided in the frame 7 at that end thereof disposed below said slot 21.

Figure 4:
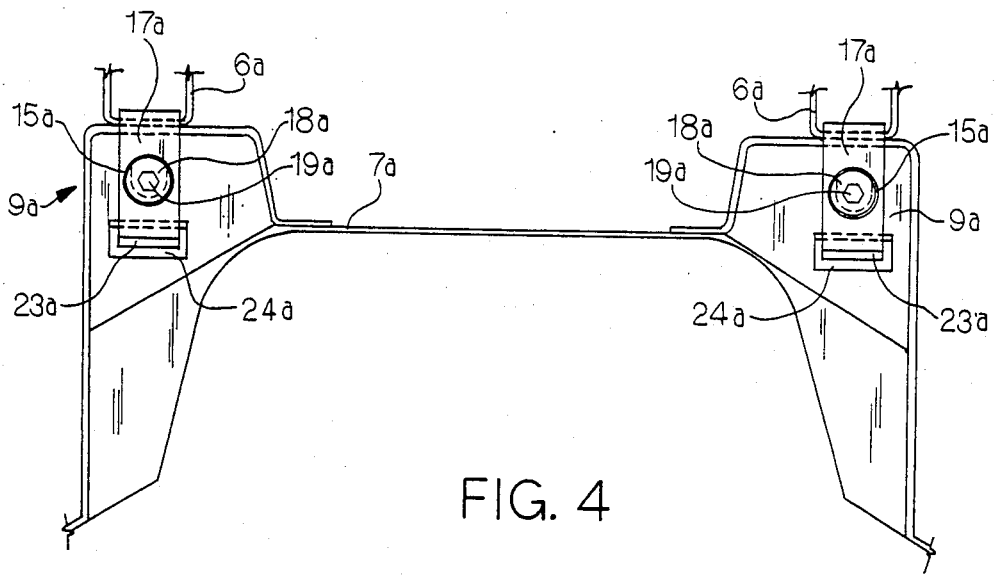
FIG. 4 is a side elevational view of a detail of FIG. 3.

In FIGS. 3 and 4, the unit for connecting the seat 2 to said motor vehicle floor is indicated overall by the reference numeral 30. As the constituent elements of said unit are essentially those which constitute the aforesaid connection unit 1, the same reference numerals are used, followed in each case by the letter a.

On comparing the connection units 1 and 30, some structural differences can however be seen. Firstly, the pins 11 and 11a are orientated in diametrically opposite directions, and in FIG. 3 the shank 20a of the screw 15a engages a through hole 21a which constitutes the equivalent of the slot 21 of FIG. 1. The screw may thread into the nut 16a fixed on the frame 7a. Finally, the end lug 23a of the bracket 17a now engages a through slot 24a constituting an equivalent means to the said open seating 24 shown in FIGS. 1 and 2. The connection unit 1 or 30 is generally firstly fixed to the seat 2 before this latter is connected to said motor vehicle floor.

With reference to FIGS. 1 and 2, the seat 2 is connected by initially resting the connection unit 1 on the frame 7 so that the positioning means 8 and locking means 9 assume the positions indicated by dashed lines. The seat 2 is then slid from left to right, resulting in the engagement of the seating 13 of the frame 7 by the pin 11 and the engagement of the seating 24 of the frame 7 by the lug 23. The screw 15 then only has to be screwed down in order to securely and safely lock the guide means 3 to the frame 7 and thus the seat 2 to said floor.

An analogous procedure is followed in the case of the connection unit 30. In this case, the guide means 3a are rested on the frame 7a and are then slid from right to left until the pin 11a engages the seating 13a and the lug 23a correspondingly engages the slot 24a. The screw 15a is then screwed down in order to securely and safely lock the seat 2 to said floor.

An examination of the characteristics of the connection units 1 and 30 constructed in accordance with the present invention underlines the advantages which they provide. In this respect, both enable the mounting operations to be effected rapidly and simply, and in a totally automatic manner. The precise and safe connection which they provide is also contributed to by the lugs 23 and 23a which, in the case of collision, prevent the guide means 3, 3a tilting in an anti-clockwise direction (FIGS. 1 and 3). Finally, it is apparent that modifications can be made to the described connection units 1 and 30, but without leaving the scope of the present invention.

We claim:

1. A unit for connecting a seat to a motor vehicle foor, comprising guide means resting on a frame fixable to the floor in such a manner as to enable said seat to be supported by said floor and to undergo translational movement relative to said floor;

said guide means comprising two first portions and two second portions;

each of said first portions being fixed to said seat and translatable relative to one of said second portions;

said seat having first and second ends;

each of said second portions being connected to said frame by one positioning means connected between said frame and each of said second portions at one of said ends of said seat and by one locking means connected between said frame and each of said second portions at the other of said ends of said seat; and each said locking means including a cooperating screw and a nut, one of which is premounted on a respective bracket fixed to a respective second portion, and the other of which is arranged to engage a corresponding open seating provided in said frame.

2. A unit as claimed in claim 1, characterised in that said positioning means comprises a pin carried by a bracket fixed to each of said second portions.

3. A unit as claimed in claim 2, characterised in that said pin has an essentially conical structure.

4. A unit as claimed in claim 1, characterised in that each said locking means includes said nut fixed on said respective bracket.

5. A unit as claimed in claim 1, characterised in that each said locking means comprises said screw carried by said bracket and arranged to engage a through hole and said nut provided on said frame.

6. A unit as claimed in claim 4, characterised in that each said bracket comprises a bent end lug which engages a corresponding seating provided in said frame in order to prevent the uncoupling of said locking means as the result of a rotational force applied to the seat around the respective positioning means as a pivot such as caused by rapid deceleration of the motor vehicle.

7. A unit as claimed in claim 5, characterised in that each said bracket comprises a bent end lug which engages a corresponding seating provided in said frame in order to prevent the uncoupling of said locking means as the result of a rotational force applied to the seat around the respective positioning means as a pivot such as caused by rapid deceleration of the motor vehicle.

8. A unit as claimed in claim 2, characterised in that each said locking means comprises said nut and cooperating screw disposed parallel to said pin whereby upon relative tightening of said screw and nut said pin is drawn into a respective seating in said frame.

* * * * *